(12) United States Patent
Saitoh (10) Patent No.: US 6,278,851 B1
(45) Date of Patent: Aug. 21, 2001

(54) IMAGE FORMING AND ACCOUNTING SYSTEM

(75) Inventor: Takashi Saitoh, Tokyo (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,398

(22) Filed: Feb. 18, 2000

(51) Int. Cl.⁷ ...................................................... G03G 21/02
(52) U.S. Cl. ...................................................... 399/79
(58) Field of Search .................... 399/79, 8, 80, 399/81; 235/375, 380, 382

(56) References Cited

U.S. PATENT DOCUMENTS

| | | | | |
|---|---|---|---|---|
| 4,501,485 | * | 2/1985 | Tsudaka | 399/79 |
| 5,162,847 | * | 11/1992 | Watanabe | 399/79 |
| 5,212,519 | * | 5/1993 | Kasahara et al. | 399/31 |
| 5,300,761 | * | 4/1994 | Kasahara et al. | 235/375 |

FOREIGN PATENT DOCUMENTS 10-111626    4/1998 (JP) .

* cited by examiner

*Primary Examiner*—Robert Beatty
(74) *Attorney, Agent, or Firm*—Foley & Lardner (57) ABSTRACT

Where a so-called tandem-copying function is selected, in which image data read by one image forming apparatus via a control panel (con-pane) unit is output and copied at high speed by two image forming apparatuses. A central control unit causes a scanner unit to read an original and stores read image data in an image memory unit. An external controller reads the image data stored in the image memory unit and feeds the data to the two image forming apparatuses as print data. Printing is effected by printer units in the respective image forming apparatuses. In this case, if a key counter is attached to one of the two image forming apparatuses or key counters are attached to the two image forming apparatuses, the central control unit and external controller perform an accounting process using the key counter.

8 Claims, 4 Drawing Sheets

IMAGE FORMING AND ACCOUNTING SYSTEM

BACKGROUND OF THE INVENTION

The present invention relates to an image forming system constructed such that a plurality of image forming apparatuses and a controller for controlling them are connected.

There is known a conventional image forming system wherein two or more image forming apparatuses are connected and image data read from one of them is printed in parallel by the plural image forming apparatuses, whereby a total work time is reduced and work efficiency is enhanced.

In such an image forming system, where accounting is performed using a detachable mechanical counter, the operation of the system is not started unless counters are connected to all image forming apparatuses which will perform printing operations in parallel.

During parallel printing operations, if any one of the mechanical counters for accounting is pulled out, the printing operations of all image forming apparatuses are stopped at the time the pull-out has been detected.

However, in the case of the above-described conventional method for image forming apparatuses which involve accounting processing using detachable mechanical counters, in order to perform printing operations in parallel with plural image forming apparatuses for enhancing work efficiency, the mechanical counters for accounting need to be attached to all image forming apparatuses to be used. In addition, if any one of the mechanical counters is pulled out, all printing operations are halted.

BRIEF SUMMARY OF THE INVENTION

The object of the present invention is to provide an image forming system wherein copying operations using a plurality of image forming apparatuses involving accounting processing can be performed without attaching mechanical counters to all image forming apparatuses, and the accounting processing can be performed without error.

In order to achieve the object, the present invention provides an image forming system in which a plurality of image forming apparatuses and a controller for controlling the apparatuses are connected, the image forming apparatus comprising: read means for optically scanning an original and reading an image; memory means for storing image data read by the read means; reception means for receiving image data transmitted from the controller; image forming means for forming an image on the basis of the image data stored in the memory means or the image data received by the reception means; and accounting means, detachably attached to the image forming apparatus, for effecting accounting, when the accounting means is attached, each time an image is formed by the image forming means, and the controller comprising: first control means for reading out the image data stored in the memory means and performing a control for forming images by means of the plurality of image forming apparatuses; and second control means for controlling the accounting means attached to the plurality of image forming apparatuses on the basis of the image formation controlled by the first control means.

The present invention provides an image forming system in which a plurality of image forming apparatuses and a controller for controlling the apparatuses are connected, the image forming apparatus comprising: read means for optically scanning an original and reading an image; memory means for storing image data read by the read means; reception means for receiving image data transmitted from the controller; image forming means for forming an image on the basis of the image data stored in the memory means or the image data received by the reception means; and accounting means, detachably attached to the image forming apparatus, for effecting accounting, when the accounting means is attached, each time an image is formed by the image forming means, and the controller comprising: first control means for reading out the image data from the memory means which stores the image data read by the read means, and performing a control for forming images by means of the image forming apparatus other than the image forming apparatus having the read means; and second control means for controlling an accounting process by the accounting means attached to the image forming apparatus having the read means, on the basis of the image formation controlled by the first control means.

DETAILED DESCRIPTION OF THE INVENTION

An embodiment of the present invention will now be described with reference to the accompanying drawings.

Figure 1:
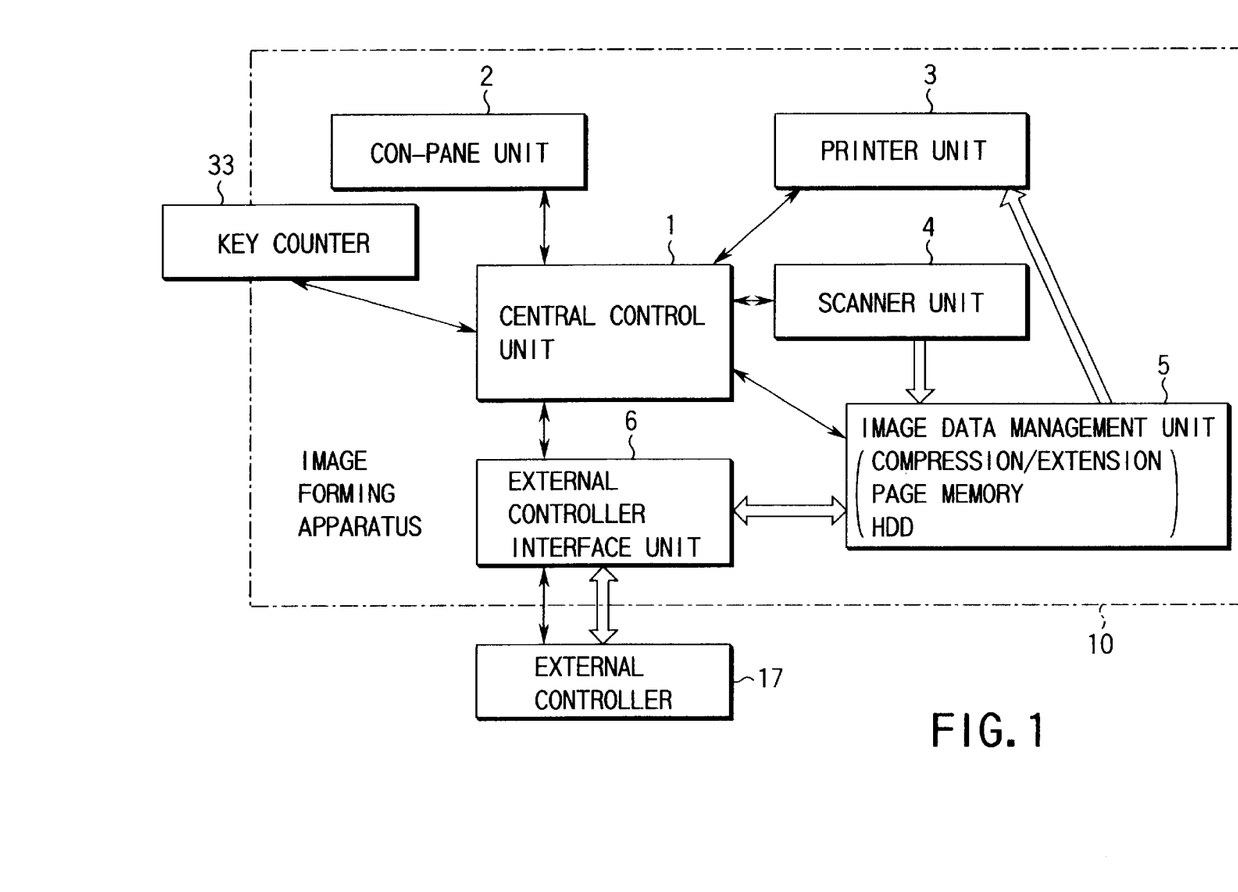
FIG. 1 shows a schematic structure of an image forming apparatus according to the present invention.

FIG. 1 shows a schematic structure of an image forming apparatus according to the present invention. An image forming apparatus 10 comprises a central control unit 1 for controlling the entirely of the apparatus; a control panel unit (hereinafter "con-pane unit") 2 serving as an input/output interface with a user; a printer unit 3 for effecting printing on paper sheets; a scanner unit 4 for reading an original; an image data management unit 5 having a memory means for compressing/extending and storing image data; and an external controller interface unit 6 for communication with an external controller 17.

In the image forming apparatus 10, the central control unit 1, con-pane unit 2, printer unit 3, scanner unit 4, image data management unit 5 and external controller interface unit 6 are connected by control interfaces. The control interfaces are indicated by single-line arrows in the figure. The central control unit 1 controls and synchronizes the con-pane unit 2, printer unit 3, scanner unit 4, image data management unit 5 and external controller interface unit 6. Thereby, the respective functions of the image forming apparatus 10 are realized.

The central control unit 1, printer unit 3, scanner unit 4, image data management unit 5 and external controller interface unit 6 are connected by image data interfaces. The image data interfaces are indicated by white-line interfaces, and image data is transmitted between the image data management unit 5, serving as a central point, and the scanner unit 4, printer unit 3 and external controller interface unit 6.

The image forming apparatus 10 is connected to the external controller 17 via the external controller interface unit 6, and it can receive image data from the external controller 17 and transmit image data to the external controller 17.

The external controller 17 can read the state of the image forming apparatus 10 via the external controller interface unit 6, and can control the central control unit 1 and con-pane unit 2 via the external controller interface unit 6.

A key counter 33 is a detachable-type mechanical counter and is used for effecting an accounting control. Attachment/detachment of the key counter 33 can be sensed by the central control unit 11, and the central control unit 1 can effect count-up of the counter.

Figure 2:
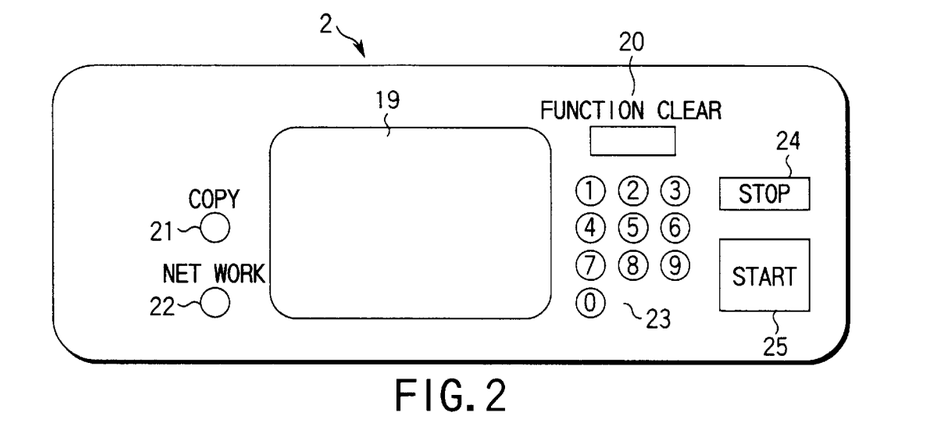
FIG. 2 shows a structure of a control panel unit.

FIG. 2 shows a structure of the con-pane unit 2 serving as input/output interface with the user of the image forming apparatus 10.

The con-pane unit 2 is provided with an LCD touch panel 19 comprising a liquid crystal display (LCD) displaying various information and a touch panel serving as input means.

A message to the user is displayed on the LCD touch panel 19. An input operation by the user is performed through the LCD touch panel 19 and hard keys 20 to 25.

The LCD touch panel 19 has two display functions: a copying-related display function employed to effect display relating to a copying function and various setting, and a network-related display function employed to display and set various states of a network. These display functions are switched by function switch keys 21, 22.

A clear key 20 is used to clear data being input, set values, etc.

The copying function switch key 21 changes the network function display to the copying function display.

The network function switch key 21 changes the copying function display to the network function display.

Ten-keys 23 are used to input numerals.

A stop key 24 is used to suspend the operation, etc.

A start key 25 is used to start the operation.

Connection between the image forming apparatus and external apparatus will now be described.

Figure 3:
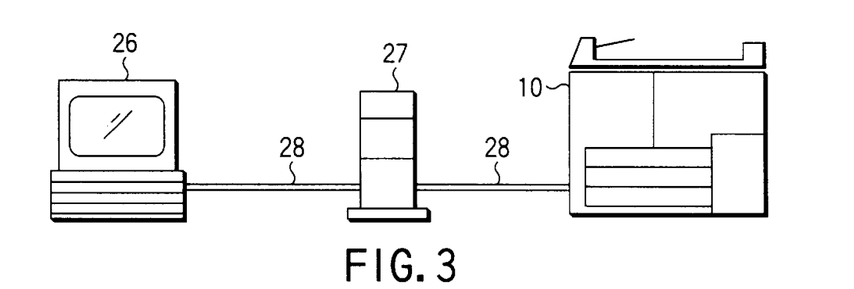
FIG. 3 shows an example of an image forming apparatus connected to an external apparatus.

FIG. 3 shows an example of the image forming apparatus 10 connected to an external apparatus (an image input/output controller in this context).

A controller 27 is connected to the external controller interface unit 6 provided in the image forming apparatus 10 via a cable 28 comprising a control interface and an image data interface. A client 26 comprising a personal computer, etc. is connected to the controller 27 via a similar cable 28.

With the above connection, data read by the scanner unit 4 of image forming apparatus 10 can be read by the controller 27, or image data fed from the printer unit 3 can be printed.

The controller 27 used as an external apparatus can also control input/output of the network function on the LCD touch panel 19 of image forming apparatus 10 by using control interfaces.

Moreover, the controller 27 may be connected to a plurality of clients 26 to effect input/output of image data, etc.

Figure 4:
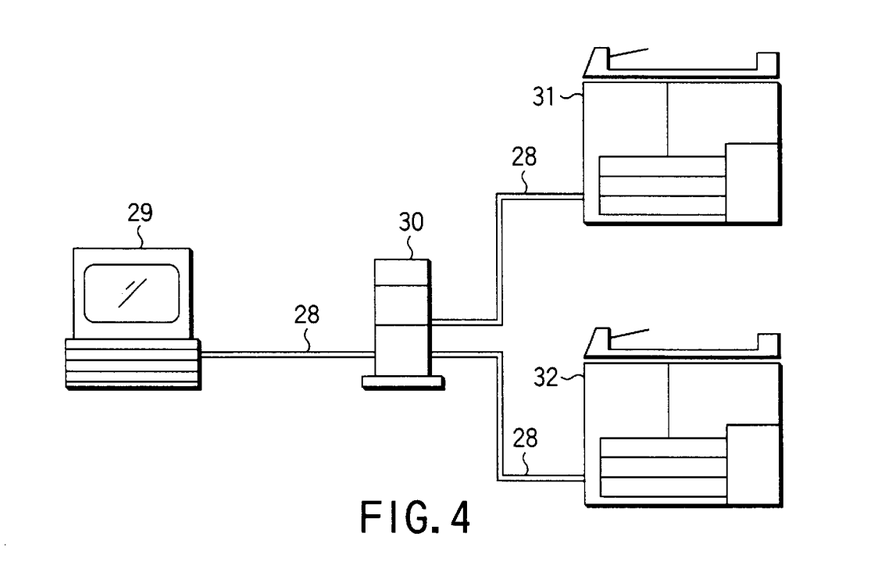
FIG. 4 shows an example of the structure of the image forming system wherein two image forming apparatuses are connected.

FIG. 4 shows an example of the structure of the image forming system wherein two image forming apparatuses are connected. A controller 30 is provided with two interfaces with image forming apparatuses, and the interfaces are connected to image forming apparatuses 31 and 32 via cables 28. Using the control interfaces and image data interfaces, the controller 30 effects input/output of image data with the two image forming apparatuses, control of the con-pane unit, etc.

A description will now be given of an accounting process for a single-unit copying operation using a detachable mechanical counter.

Figure 5:
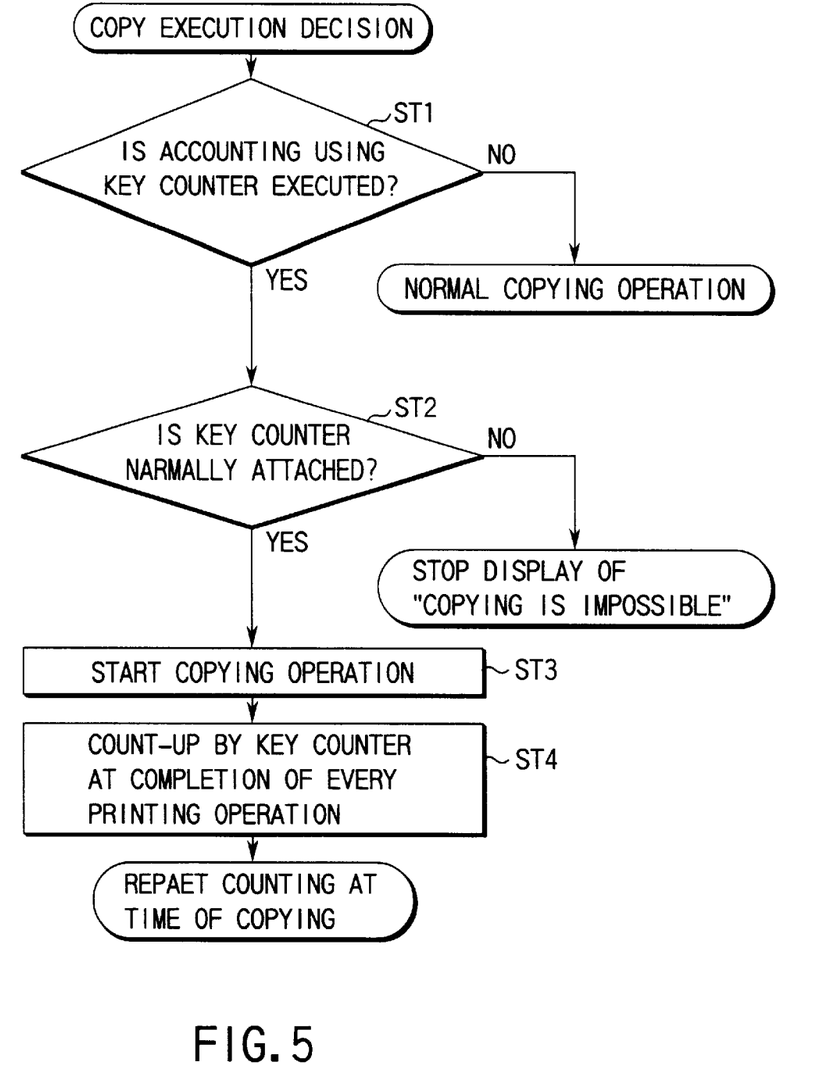
FIG. 5 is a flow chart illustrating a count-up process for carrying out an accounting process using a key counter.

FIG. 5 is a flow chart illustrating a count-up process for carrying out the accounting process using the key counter 33 in the image forming apparatus 10.

The key counter 33 is connected to the central control unit 1 and is detachable. Attachment/detachment of the key counter 33 can be sensed by the central control unit 1.

The key counter 33 is a mechanical counter which counts up upon a count-up instruction from the central control unit 1.

The central control unit 1 determines whether the accounting process using the key counter 33 should be executed at the time of power-on, on the basis of the content of the set value which can be varied by servicemen alone (ST1).

If the accounting process is not executed, the central control unit 1 performs a normal copying operation. In this case, the user can carry out the copying operation without performing particular operations.

When the accounting process is to be performed, the central control unit 1 determines whether the key counter 33 is normally attached to the image forming apparatus 10 (ST2).

If it is not normally attached, the central control unit 1 does not perform the copying operation and causes the LCD touch panel 19 to display a message to the effect that the copying operation cannot be performed.

Where the key counter 33 is normally attached, the central control unit 1 starts the copying operation (ST3) and instructs the key counter 33 to count up each time the printing operation is completed (ST4).

A description will now be given of a high-efficiency copying operation with a plurality of image forming apparatuses connected to an external controller according to the present invention.

Figure 6:
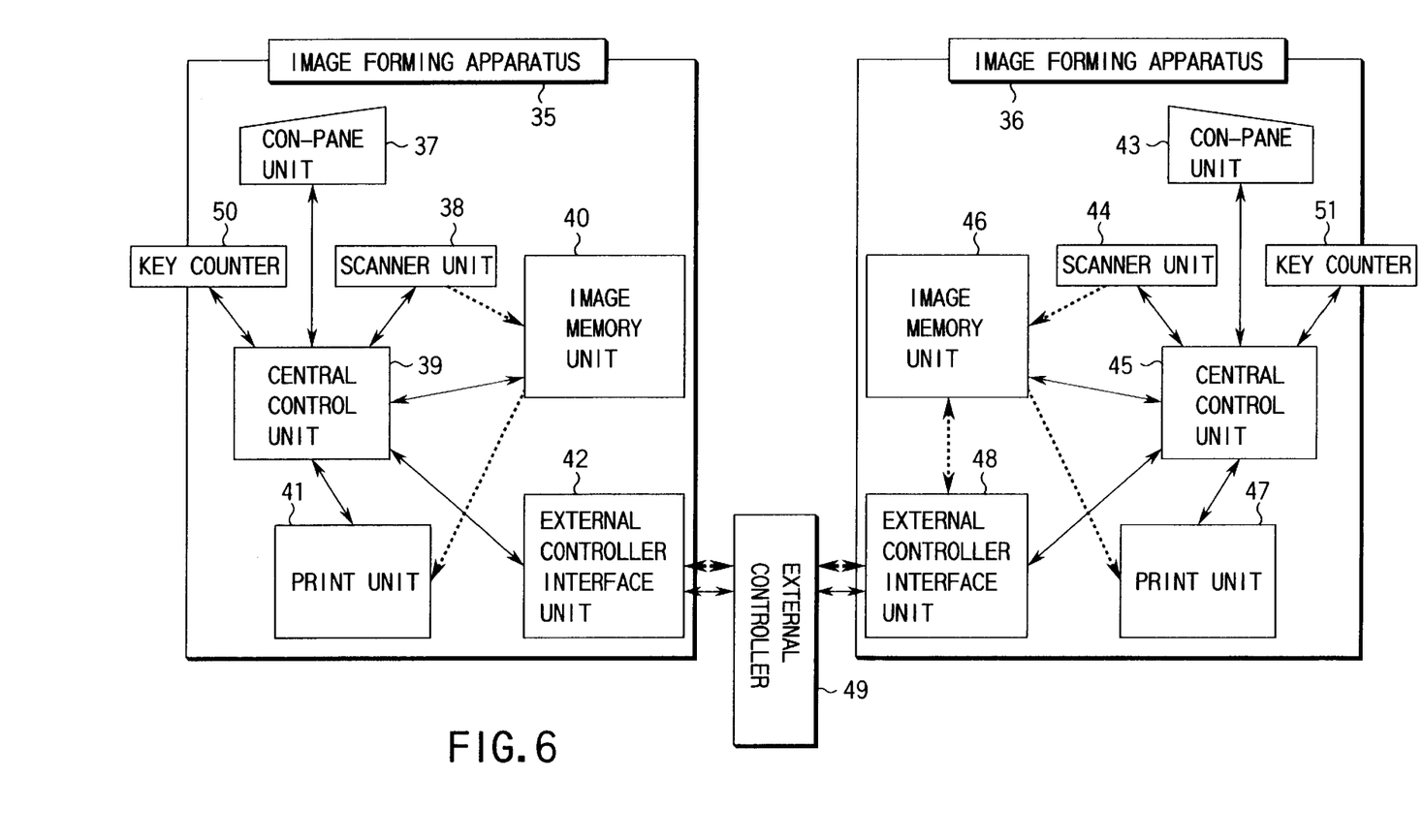
FIG. 6 is a block diagram showing a structure of an image forming system wherein two image forming apparatuses are connected to one external controller.

FIG. 6 shows a structure of an image forming system wherein two image forming apparatuses 35, 36 are connected to one external controller 49. In a basic concept, a plurality of image forming apparatuses are connected to one external controller via external controller interfaces.

In the figure, the image forming apparatuses 35, 36 are connected to the external controller 49. The state of the image forming apparatus 35, 36 can be recognized by the external controller 49 using the flow of control signals.

The image forming apparatus 35 comprises a con-pane unit 37, a scanner unit 38 serving as reading means, a central control unit 39, an image memory unit 40 serving as memory means, a printer unit 41 serving as image forming means, and an external controller interface 42 serving as transmission means and reception means. The image forming apparatus 35 is provided with a key counter 50.

The image forming apparatus 36 comprises a con-pane unit 43, a scanner unit 44 serving as reading means, a central control unit 45, an image memory unit 46 serving as memory means, a printer unit 47 serving as image forming means, and an external controller interface 48 serving as transmission means and reception means. The image forming apparatus 36 is provided with a key counter 51.

The external controller 49 can function as control means to cause the image memory unit 40, 46 to store images read by the scanner unit 38, 44 of image forming apparatus 35, 36, or to cause the printer unit 41, 47 to print the images stored in the image memory unit 40, 46.

Image data from the external controller 49 can be stored in the image memory unit 40, 46, or image data stored in the image memory unit 40, 46 can be read out to the external controller 49.

A description will now be given of a method of enhancing the efficiency of copying operations with the above structure, wherein an image read by one of the image forming apparatuses is output from both image forming apparatuses.

The operator selects through the con-pane unit 37 a function (hereinafter referred to as "tandem-copying function") realizing a high-speed copying operation wherein an image read by one image forming apparatus 35 is output from both image forming apparatuses 35, 36.

Subsequently, the central control unit 39 causes the scanner unit 38 to read an original and stores the read image data in the image memory unit 40. The image data is read by the external controller 49 via the external controller interface 42. The read image data is fed from the external controller 49 to the image forming apparatus 35 and image forming apparatus 36 as print data. In order to make a designated number of copies in a shortest time period, print parameters (number of copies, etc.) are set according the specifications of the respective image forming apparatuses 35, 36 and registered as print jobs. This enables the image forming apparatuses 35, 36 to execute printing operations.

A description will now be given of a process for carrying out the aforementioned accounting process using the key counter (50, 51) in the tandem-copying operation. In the case of the present system, in the tandem-copying operation, the external controller 49 manages the sensing of attachment/detachment state of the key counter (50, 51) and count-up control of the key counter (50, 51).

Some examples of the mode of the accounting process and merits thereof will now be described.

In a first embodiment, the key counter is attached to one of the apparatuses. Specifically, referring to FIG. 6, it is assumed that the key counter 50 is attached to the image forming apparatus 35 and the key counter 51 is not attached to the image forming apparatus 36.

Case 1: The user performs setting for the tandem-copying operation through the con-pane unit 37 in the image forming apparatus 35. The central control unit 39 in the image forming apparatus 35 causes the scanner unit 38 to read an original and stores the read image data in the image memory unit 40. The external controller 49 reads the image data stored in the image memory unit 40 via the external controller interface 42. The read image data is fed to the image forming apparatus 35 and image forming apparatus 36 as print data. The print data is printed out by the printer unit 41 of image forming apparatus 35 and the printer unit 47 of image forming apparatus 36. At the time of the printing, the accounting process is carried out by the key counter 50.

In this case, in the image forming apparatus 35, completion of print is told from the printer unit 41 to the central control unit 39 each time printing on one page is completed, and the central control unit 39 instructs the key counter 50 to count up.

In the image forming apparatus 36, completion of print is told from the printer unit 47 to the central control unit 45 each time printing on one page is completed, and the central control unit 45 informs the external controller 49 via the external controller interface 48 of the completion of page printing. The external controller 49 notifies the central control unit 39 of image forming apparatus 35 via the external controller interface 42 of the completion of page printing in the image forming apparatus 36.

On the basis of the notification of the completion of page printing in the image forming apparatus 36, the central control unit 39 of image forming apparatus 35 instructs the key counter 50 to count up.

According to Case 1, printing-out is effected by both image forming apparatuses, and all count-up is effected by the attached key counter. Even where only one key counter is attached, printing-out can be performed using time efficiently.

Case 2: The user performs setting for the tandem-copying operation through the con-pane unit 37 in the image forming apparatus 35. The central control unit 39 causes the scanner unit 38 to read an original and stores the read image data in the image memory unit 40. The image data stored in the image memory unit 40 is printed out by only the printer unit 41. At the time of the printing, the accounting process is carried out by the key counter 50.

In this case, in the image forming apparatus 35, the completion of every page printing is told from the printer unit 41 to the central control unit 39, the central control unit 39 instructs the key counter 50 to count up.

In the image forming apparatus 36, no printing operation is performed and so the accounting process is not needed.

According to Case 2, where the key counter is attached to the image forming apparatus which has effected scan, the printing is performed by only the image forming apparatus to which the key counter is connected (the same as the prior art).

Case 3: The user performs setting for the tandem-copying operation through the con-pane unit 37 in the image forming apparatus 35. The central control unit 39 causes the scanner unit 38 to read an original and stores the read image data in the image memory unit 40. The external controller 49 reads the image data stored in the image memory unit 40 via the external controller interface 42. The read image data is fed to the image forming apparatus 36 as print data. The print data is printed out by the printer unit 47 of image forming apparatus 36. At the time of the printing, the accounting process is carried out by the key counter 50.

In this case, in the image forming apparatus 35, no printing operation is performed and so the accounting process is not needed.

In the image forming apparatus 36, completion of print is told from the printer unit 47 to the central control unit 45 each time printing on one page is completed, and the central control unit 45 informs the external controller 49 via the external controller interface 48 of the completion of page printing. The external controller 49 notifies the central control unit 39 of image forming apparatus 35 via the external controller interface 42 of the completion of page printing in the image forming apparatus 36.

On the basis of the notification of the completion of page printing in the image forming apparatus 36, the central control unit 39 of image forming apparatus 35 instructs the key counter 50 to count up.

According to Case 3, where the key counter is attached to only the image forming apparatus which has effected scan, printing-out is effected by the image forming apparatus to which the key counter is not attached and count-up is effected by the attached key counter.

The copying operation can be performed where there is abnormality in the printing unit of one image forming apparatus and there is abnormality in the scan unit of the other image forming apparatus.

In any of Cases 1, 2 and 3, the printing operation is halted if the sole key counter 50 is detached.

In a second embodiment, key counters are attached to both apparatuses. Specifically, referring to FIG. 6, it is assumed that the key counter 50 is attached to the image forming apparatus 35 and the key counter 51 is attached to the image forming apparatus 36.

Case 4: The user performs setting for the tandem-copying operation through the con-pane unit 37 in the image forming apparatus 35. The central control unit 39 causes the scanner unit 38 to read an original and stores the read image data in the image memory unit 40. The external controller 49 reads the image data stored in the image memory unit 40 via the external controller interface 42. The read image data is fed to the image forming apparatus 35 and image forming apparatus 36 as print data. The print data is printed out by the printer unit 41 of image forming apparatus 35 and the printer unit 47 of image forming apparatus 36. At the time of the printing, the accounting process is carried out by the two key counters 50, 51.

In this case, in the image forming apparatus 35, completion of print is told from the printer unit 41 to the central control unit 39 each time printing on one page is completed, and the central control unit 39 instructs the key counter 50 to count up.

In the image forming apparatus 36, completion of print is told from the printer unit 47 to the central control unit 45 each time printing on one page is completed, and the central control unit 45 instructs the key counter 51 to count up.

Case 5: When the key counter 50 is detached from the image forming apparatus 35 during the tandem-copying operation in Case 4, the central control unit 39 entirely stops the tandem-copying operation. The tandem-copying operation is not resumed until the key counter 50 is attached once again. On the other hand, when the key counter 51 is detached from the image forming apparatus 36, the central control unit 45 entirely stops the tandem-copying operation. The tandem-copying operation is not resumed until the key counter 51 is attached once again.

Case 6: When the key counter 50 is detached from the image forming apparatus 35 during the tandem-copying operation in Case 4, the tandem-copying operations in both image forming apparatuses 35, 36 are continued by the central control units 39, 45 and external controller 47. In this case, the accounting process for the tandem-copying operation is performed by the key counter 51 until the key counter 50 is attached. On the other hand, when the key counter 51 is detached from the image forming apparatus 36, the tandem-copying operations in both image forming apparatuses 35, 36 are continued by the central control units 39, 45 and external controller 47. In this case, the accounting process for the tandem-copying operation is performed by the key counter 50 until the key counter 51 is attached.

Case 7: When the key counter 50 is detached from the image forming apparatus 35 during the tandem-copying operation in Case 4, the copying operation is continued by the image forming apparatus 36 alone. In this case, printing by the image forming apparatus 35 is not resumed until the key counter 50 is attached and accounting is executed by the key counter 51. On the other hand, when the key counter 51 is detached from the image forming apparatus 36, the copying operation is continued by the image forming apparatus 35 alone. In this case, printing by the image forming apparatus 36 is not resumed until the key counter 51 is attached and accounting is executed by the key counter 50.

Case 8: The user performs setting for the tandem-copying operation through the con-pane unit 37 in the image forming apparatus 35. The central control unit 39 causes the scanner unit 38 to read an original and stores the read image data in the image memory unit 40. The external controller 49 reads the image data stored in the image memory unit 40 via the external controller interface 42. The read image data is fed to the image forming apparatus 35 and image forming apparatus 36 as print data. The print data is printed out by the printer unit 41 of image forming apparatus 35 and the printer unit 47 of image forming apparatus 36. At the time of the printing, the accounting process is carried out by the key counters 50 alone of the apparatus which has effected reading.

In this case, in the image forming apparatus 35, completion of print is told from the printer unit 41 to the central control unit 39 each time printing on one page is completed, and the central control unit 39 instructs the key counter 50 to count up.

In the image forming apparatus 36, completion of print is told from the printer unit 47 to the central control unit 45 each time printing on one page is completed, and the central control unit 45 informs the external controller 49 via the external controller interface 48 of the completion of page printing. The external controller 49 notifies the central control unit 39 of image forming apparatus 35 via the external controller interface 42 of the completion of page printing in the image forming apparatus 36.

On the basis of the notification of the completion of page printing in the image forming apparatus 36, the central control unit 39 of image forming apparatus 35 instructs the key counter 50 to count up.

If the key counter 50 is detached, the tandem-copying operations are entirely stopped.

According to Case 8, printing-out is effected by both image forming apparatuses, and count-up is effected by the image forming apparatus which has performed scanning. Thus, count-up is effected by the key counter of one of the apparatuses, and it becomes easy to understand the number of total printed-out copies.

Case 9: The user performs setting for the tandem-copying operation through the con-pane unit 37 in the image forming apparatus 35. The central control unit 39 causes the scanner unit 38 to read an original and stores the read image data in the image memory unit 40. The external controller 49 reads the image data stored in the image memory unit 40 via the external controller interface 42. The read image data is fed to the image forming apparatus 35 and image forming apparatus 36 as print data. The print data is printed out by the printer unit 41 of image forming apparatus 35 and the printer unit 47 of image forming apparatus 36. At the time of the printing, the accounting process is carried out by the key counters 51 alone of the apparatus which has not effected reading (that is, has effected printing alone).

In this case, in the image forming apparatus 35, completion of print is told from the printer unit 41 to the central control unit 39 each time printing on one page is completed, and the central control unit 39 informs the external controller 49 via the external controller interface 42 of the completion of page printing. The external controller 49 notifies the central control unit 45 of image forming apparatus 36 via the external controller interface 48 of the completion of page printing in the image forming apparatus 35.

On the basis of the notification of the completion of page printing in the image forming apparatus 35, the central control unit 45 of image forming apparatus 36 instructs the key counter 51 to count up.

In the image forming apparatus 36, completion of print is told from the printer unit 47 to the central control unit 45 each time printing on one page is completed, and the central control unit 45 instructs the key counter 51 to count up.

According to Case 9, printing-out is effected by both image forming apparatuses, and count-up is effected by the image forming apparatus which has not performed scanning.

If the key counter 51 is detached, the tandem-copying operations are entirely stopped.

A third embodiment will now be described.

In the third embodiment, the accounting process can be performed without fail when the key counter is detached during printing.

Case 10: Where the key counter is attached to one of the apparatuses as in the first embodiment, if the key counter is detached, the printing is halted. The halt of the printing is continued until the key counter is attached to one of the apparatuses.

Case 11: Where the key counters are attached to both apparatuses as in Case 5 in the second embodiment, if one of the key counters is detached, the tandem-copying operations are entirely halted. The tandem-copying operations are halted until the key counter is attached once again.

Case 12: Where the key counters are attached to both image forming apparatuses as in Case 6 in the second embodiment, if one of the key counters is detached, the tandem-copying operations are continued in both image forming apparatuses. The count-up is performed by the other key counter.

Case 13: Where the key counters are attached to both image forming apparatuses as in Case 7 in the second embodiment, if one of the key counters is detached, the copying operation is continued in the image forming apparatus alone to which the key counter remains attached. If the key counter is attached once again, the printing operations are performed in both image forming apparatuses.

As has been described above, according to the embodiments of the present invention, the tandem-copying operations involving the accounting process can be performed even if key counters are not attached to all image forming apparatuses, and the accounting process can be executed without fail.

What is claimed is:

1. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and
said controller comprising:
a first control unit for reading out the image data stored in said memory unit and performing a control for forming images using said plurality of image forming apparatuses; and
a second control unit, wherein in a case where said second control unit controls a total accounting by only the accounting unit attached among said plural image forming apparatuses, said second control unit stops all image forming operations of said plural image forming apparatuses when said accounting unit is detached from the image forming apparatus.

2. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and
said controller comprising:
a first control unit for reading out the image data stored in said memory unit and performing a control for forming images using said plurality of image forming apparatuses; and
a second control unit, wherein in a case where said accounting unit is attached to all of said plural image forming apparatuses, said second control unit controls the accounting by the respective accounting unit, and where any one of the accounting units is detached, all image forming operations of said plural image forming apparatuses are stopped.

3. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and
said controller comprising:
a first control unit for reading out the image data stored in said memory unit and performing a control for forming images by using said plurality of image forming apparatuses; and
a second control unit, wherein in a case where said accounting units are attached to all of said plural image forming apparatuses, said second control unit controls the accounting by the respective accounting unit, and where the accounting unit is detached from the image forming apparatus, said second control unit performs a control for carrying out an accounting process of said image forming apparatus by the other accounting unit.

4. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and said controller comprising:
a first control unit for reading out the image data stored in said memory unit and performing a control for forming images using said plurality of image forming apparatuses; and
a second control unit, wherein in a case where said accounting units are attached to all of said plural image forming apparatuses, said second control unit controls the accounting by the respective accounting unit, and where the accounting unit is detached from the image forming apparatus, said second control unit stops an image forming operation of said image forming apparatus alone.

5. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and said controller comprising:
a first control unit for reading out the image data stored in said memory unit and performing a control for forming images using said plurality of image forming apparatuses; and
a second control unit, wherein in a case where said accounting units are attached to all of said plural image forming apparatuses, said second control unit controls an entire accounting operation by only the accounting unit attached to the image forming apparatus which reads the original by said read unit.

6. An image forming system according to claim 5, wherein in a case where said accounting units are attached to all of said plural image forming apparatuses and said second control unit controls an entire accounting operation by only the accounting unit attached to the image forming apparatus which reads the original by said read unit, if the accounting unit is detached from the image forming apparatus, said second control unit stops all image forming operations of said plural image forming apparatuses.

7. An image forming system in which a plurality of image forming apparatuses and a controller for controlling said apparatuses are connected, said image forming apparatus comprising:
a read unit for optically scanning an original and reading an image;
a memory unit for storing image data read by said read unit;
a reception unit for receiving image data transmitted from said controller;
an image forming unit for forming an image on the basis of the image data stored in said memory unit or the image data received by said reception unit; and
an accounting unit, detachably attached to said image forming apparatus, for effecting accounting, when said accounting unit is attached, each time an image is formed by the image forming unit, and said controller comprising:
a first control unit for reading out the image data stored in said memory unit and performing a control for forming images using said plurality of image forming apparatuses; and
a second control unit, wherein in a case where said accounting units are attached to all plural image forming apparatuses, said second control unit controls an accounting operation by the accounting unit attached to the image forming apparatus which does not read the original by said read unit.

8. An image forming system according to claim 7, wherein in a case where said accounting units are attached to all of said plural image forming apparatuses and said second control unit controls an entire accounting operation by the accounting unit attached to the image forming apparatus which does not read the original by said read unit, if the accounting unit is detached from the image forming apparatus, said second control unit stops all image forming operations of said plural image forming apparatuses.

* * * * *